United States Patent [19]

Fossum et al.

[11] Patent Number: 4,888,679
[45] Date of Patent: Dec. 19, 1989

[54] METHOD AND APPARATUS USING A CACHE AND MAIN MEMORY FOR BOTH VECTOR PROCESSING AND SCALAR PROCESSING BY PREFETCHING CACHE BLOCKS INCLUDING VECTOR DATA ELEMENTS

[75] Inventors: Tryggve Fossum; Ricky C. Hetherington; David B. Fite, Jr., all of Northboro; Dwight P. Manley, Holliston; Francis X. McKeen, Westboro; John E. Murray, Acton, all of Mass.

[73] Assignee: Digital Equipment Corporation, Maynard, Mass.

[21] Appl. No.: 142,794

[22] Filed: Jan. 11, 1988

[51] Int. Cl.$^4$ .................... G06F 9/38; G06F 15/347
[52] U.S. Cl. ................... 364/200; 364/232.21; 364/243.4; 364/243.41; 364/263.1
[58] Field of Search .................. 364/200, 300, 900

[56] References Cited

U.S. PATENT DOCUMENTS

| | | | |
|---|---|---|---|
| 4,594,682 | 6/1986 | Drimak | 364/900 |
| 4,620,275 | 10/1986 | Wallach et al. | 364/200 |
| 4,760,518 | 7/1988 | Potash et al. | 364/200 |
| 4,771,380 | 9/1988 | Kris | 364/200 |

Primary Examiner—Raulfe B. Zache
Attorney, Agent, or Firm—Arnold, White & Durkee

[57] ABSTRACT

A main memory and cache suitable for scalar processing are used in connection with a vector processor by issuing prefetch requests in response to the recognition of a vector load instruction. A respective prefetch request is issued for each block containing an element of the vector to be loaded from memory. In response to a prefetch request, the cache is checked for a "miss" and if the cache does not include the required block, a refill request is sent to the main memory. The main memory is configured into a plurality of banks and has a capability of processing multiple references. Therefore the different banks can be referenced simultaneously to prefetch multiple blocks of vector data. Preferably a cache bypass is provided to transmit data directly to the vector processor as the data from the main memory are being stored in the cache. In a preferred embodiment, a vector processor is added to a digital computing system including a scalar processor, a virtual address translation buffer, a main memory and a cache. The scalar processor includes a microcode interpreter which sends a vector load command to the vector processing unit and which also generates vector prefetch requests. The addresses for the data blocks to be prefetched are computed based upon the vector address, the length of the vector and the "stride" or spacing between the addresses of the elements of the vector.

31 Claims, 6 Drawing Sheets

METHOD AND APPARATUS USING A CACHE AND MAIN MEMORY FOR BOTH VECTOR PROCESSING AND SCALAR PROCESSING BY PREFETCHING CACHE BLOCKS INCLUDING VECTOR DATA ELEMENTS

BACKGROUND OF THE INVENTION

1. Technical Field

The present invention relates generally to the field of memories for digital computers, and more particularly to the fetching of vector data from memory. Specifically, the present invention relates to the use of a cache memory in connection with a vector processor.

2. Background Art

Throughout the evolution of the digital computer, the cost of memory has been a major factor in the overall system price. Although memories have become relatively inexpensive, there are available memories with varying storage capacities and performance characteristics available at different costs. It is desirable to use the fastest memory available so as not to limit the execution speed of the data processor. The fastest memory available, however, is the most expensive, and most applications cannot justify the cost of a high speed memory of sufficient capacity to hold a complete program and its associated data. Therefore, the memory of a typical digital computer includes a relatively small portion of high-speed memory for frequent access by the data processor, and a relatively large portion of slower-speed memory for less frequent access. The slower-speed memory serves as the "main memory" of the computer.

In the typical computer as described above, the user could be permitted to load the high-speed memory with the most frequently accessed code and data, and if necessary transfer code and data between the high-speed memory and main memory during execution, to obtain the optimum execution speed for the particular program. A major advance occurred, however, when it was discovered that near-optimum performance will usually result if a certain sized block of data or code is automatically transferred from the main memory to the high-speed memory whenever the processing unit references a piece of data or code that is not currently stored in the high-speed memory. The near optimum performance is due to the principle of locality of memory references in time and space; there is a relatively high probability that subsequent program or data references will occur at a memory address within the same block of addresses as the previous program or data reference. For automatic transfer of data and program blocks, the high-speed memory is organized as an associative memory called the "cache." The configuration and operation of the cache is further described in Chapter 11 of Levy and Eckhouse, Jr., *Computer Programming and Architecture—The VAX*-11, Digital Equipment Corporation (1980), pp. 351-368.

Vector processing is an application in which the use of a cache has provided only marginal benefits. In a vector processor, an arithmetic unit and associated registers are provided for accelerating repetitive operations on sequential data elements. Vector processing is disclosed, of example, in Cray, Jr., U.S. Pat. No. 4,128,880; Chen et al., U.S. Pat. No. 4,636,942; and Chen et al., U.S. Pat. No. 4,661,900. The vector data elements are stored in relatively large data structures in main memory. These structures often exceed the size of the cache. In vector processing, the structures are usually accessed in a linear, rather than clustered manner, and the common caching algorithms will not work well. Due to these considerations, many vector processors either do not include a cache, or they do not cache vector data. An example of the first instance is the CRAY-1 computer, in which the entire memory system is constructed of the fastest available memory. In the second instance, high-speed memory is provided for storing vector data, and separate memory and an associated cache are provided for storing the program.

It would be desirable to use a typical cache and main memory in association with a vector processor. In such a case, the cache and memory could be used for both vector processing and scalar processing; the vector processor and the scalar processor could then share the same cache and main memory. A typical cache and main memory, however, is designed for scalar processing, and therefore has a relatively large block size, and does not handle multiple independent or interleaved memory requests. But for vectors, it is difficult to select a block size that is suited to the various ways in which the vector elements are dispersed in the memory space. Although a large block size would more often include most of the vector elements so as to reduce the frequency of fetching blocks from the main memory, the time required for each fetch increases with increased block size. In addition, the vectors may be stored in non-contiguous locations so that the vector will be stored in many blocks and there could be only one vector element per block fetched. Therefore, the cache cannot be made to work well for vectors merely by attempting to select an optimum block size.

SUMMARY OF THE INVENTION

Accordingly, the main objective of the present invention is to provide a cache and main memory suitable for both vector processing and scalar processing.

Another object of the invention is to take a main memory and cache optimized for scalar processing and make it suitable for vector processing as well.

Yet another object of the invention is to provide a method whereby a vector processor and a scalar processor can efficiently share the same main memory and cache.

Briefly, in accordance with the invention, a main memory and cache suitable for scalar processing are used in connection with a vector processor by issuing prefetch requests in response to the recognition of a vector load instruction. A respective prefetch request is issued, for example, for each block containing an element of the vector to be loaded from memory. In response to a prefetch request, the cache is checked to determine whether it includes the required block, and if the cache does not include the required block, a refill request is sent to the main memory. The main memory is configured into a plurality of banks and has the capability of processing multiple references. Therefore, the different banks can be referenced simultaneously to prefetch multiple blocks of vector data. Preferably the memory banks have respective addresses interleaved on block boundaries to permit the blocks to be prefetched sequentially in a linear fashion with respect to the block addresses.

When the vector data returns from the main memory, the data are stored in the cache for possible access in response to a following vector load command. In accordance with an additional feature of the invention, a cache bypass is provided to transmit data directly to the vector processor as the data from the main memory are being stored in the cache. The bypass saves the time that would otherwise be required in reading the vector data from the cache.

In a preferred embodiment, a vector processor is added to a digital computing system including a scalar processor, a virtual address translation buffer, a main memory, and a cache. The scalar processor includes a microcode interpreter which interprets memory access requests to the cache. The memory access requests include virtual addresses. The virtual addresses are translated by the virtual address translation buffer, and the corresponding physical addresses are sent to the cache.

In response to a vector load instruction, the scalar processor executes microcode for sending a vector load command to the vector processor, and also for sending the vector prefetch requests to the cache. The vector prefetch requests include the virtual addresses of the blocks that will be accessed by the vector processor. These virtual addresses are computed based upon the vector address, the length of the vector, and the stride or spacing between the addresses of the adjacent elements of the vector.

Upon receipt of the vector load command, the vector processor sends requests to the cache for the individual vector elements. The requests for the individual vector elements are processed independently of the vector prefetch requests. Since the scalar processor is idle during a vector load cycle after issuing its prefetch commands, its address generator and data path can be shared by the vector processor. If the cache encounters a memory fault during a prefetch request, the request is dismissed, since the fault will occur later during processing of a request for an individual vector element. If the translation buffer encounters a miss during a prefetch request, the miss is processed as part of the prefetch, and therefore a miss will not occur during processing of the requests for the individual vector elements.

BRIEF DESCRIPTION THE DRAWINGS

Other objects and advantages of the invention will become apparent upon reading the following detailed description and upon reference to the drawings in which.

Figure 1:
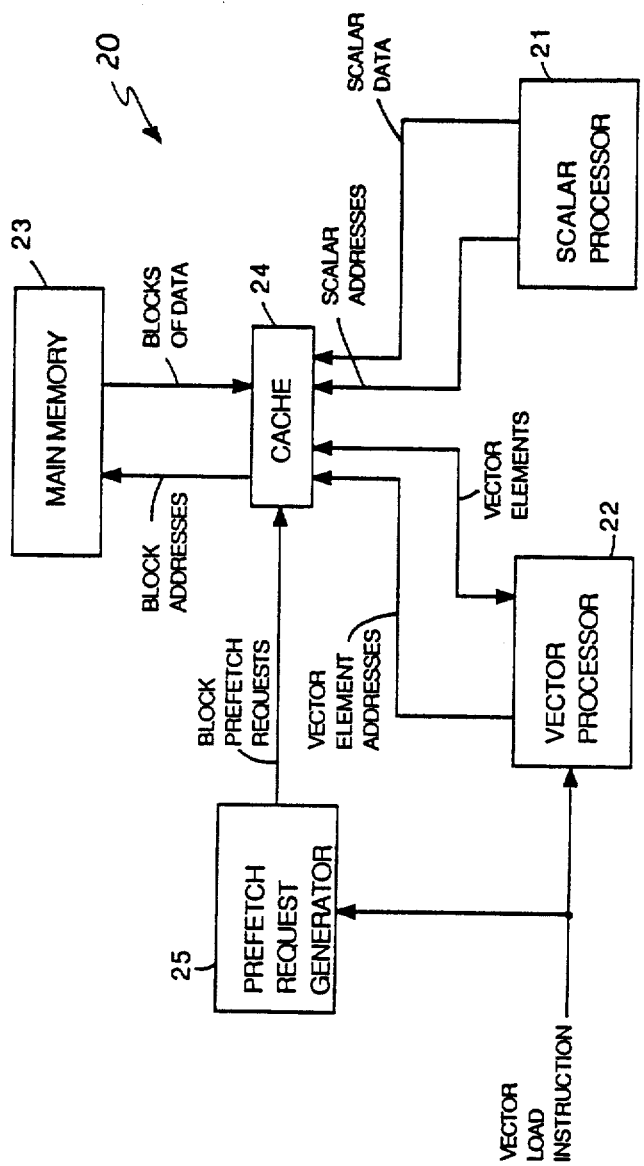
FIG. 1 is a schematic diagram illustrating the invention being used in a digital computer having both a vector processor and a scalar processor.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, there is shown in FIG. 1 a digital computer generally designated 20 which includes both a scalar processor 21 and a vector processor 22 which share access to a common main memory 23. In accordance with the design of a conventional digital computer employing a scalar processor, the digital computer 20 includes a cache 24 which on an average basis enables the scalar processor 21 to process scalar data at a faster rate than the access time of the main memory 23. The cache 24 includes means for storing selected predefined blocks of data elements, means for receiving requests from the scalar processor 21 to access a specified data element, means for checking whether the data element is in a block stored in the cache, and means operative when data for the block including the specified data element is not so stored for reading the specified block of data from the main memory 23 and storing the block of data in the cache 24.

In other words, the cache provides a "window" into the main memory, and contains data likely to be needed by the scalar processor. If a data element needed by the scalar processor is not found in the cache 24, then the data element is obtained from the main memory 23, but in the process an entire block, including additional data, is obtained from the main memory 23 and written into the cache 24. Due to the principle of locality in time and memory space, the subsequent times that the scalar processor 21 desires a data element, chances are that this data element will be found in the block which includes the previously addressed data element. Therefore, chances are that the cache 24 will already include the data element desired by the scalar processor 21. In general, since the cache 24 will be accessed at a much higher rate than the main memory 23, the main memory 23 can have a proportionally slower access time than the cache 24 without substantially degrading the average performance of the scalar processor 21. Therefore, the main memory 23 can be comprised of slower and less expensive memory elements.

As shown in FIG. 1, the vector processor 22 also accesses the cache 24 to obtain vector elements. The vector processor 22, for example, receives a vector load instruction which commands the vector processor to send vector element addresses to the cache 24, and in response to those vector element addresses, the cache transmits the desired vector elements to the vector processor. It is desired to use a cache 24 which is primarily designed for use with the scalar processor 21. Therefore, the cache 24 can use memory and control circuits that are found in conventional and commercially available computer systems. For practicing the invention, for example, it is desired to use a cache 24 and main memory 23 that are similar to the cache and main memory of a "VAX-11" digital computer as described in Chapter 11 of Levy and Eckhouse, Jr., *Computer Programming and Architecture VAX*-11, Digital Equipment Corporation (1980) pp. 351-368, herein incorporated by reference. Such "VAX" brand digital computers are commercially available from Digital Equipment Corporation, 111 powder mill Road, Maynard, Mass. 01754-1418.

Although cache memories have been found to work extremely well for scalar processing, they have worked less well for vector processing, and consequently, typical vector processing systems either do not include a cache or they do not cache vector data. The size of the vector data structures typically exceed the size of the data block in a cache designed for scalar processing, and sometimes the size of the vector data structure exceeds the size of the cache memory. Sometimes a vector will be small enough to fit in the block size, but even in this case, it is possible for the vector to extend across a block boundary. If this occurs, the fetching of all the elements in the vector could be interrupted when the block boundary is crossed during addressing of the cache. Also, even if a vector has a small number of elements, it is possible for these elements to be stored in spaced or non-contiguous memory locations so that only a few vector elements per block would be addressed. In this case, the addressing of the cache memory could be interrupted when the block boundaries are crossed.

In accordance with an important aspect of the present invention, the digital computer 20 is provided with a prefetch request generator 25 which issues block prefetch requests to the cache 24 in response to a vector load instruction. The prefetch request generator 25 issues the block prefetch requests at a high rate to ensure that the required memory blocks are transferred from the main memory 23 to the cache 24 as soon as possible. In general, the required blocks are requested before the corresponding vector elements are addressed by the vector processor, and in some cases the blocks will have been fetched from memory by the time that the vector processor 22 addresses the vector elements specified by the vector load instruction.

The prefetch request generator 25 includes means for receiving the vector information specified by the vector load instruction, means for determining the blocks of data which include at least one element of the specified vector, and means for transmitting requests to reference the blocks of data which are determined to include at least one data element of the vector.

Figure 2:
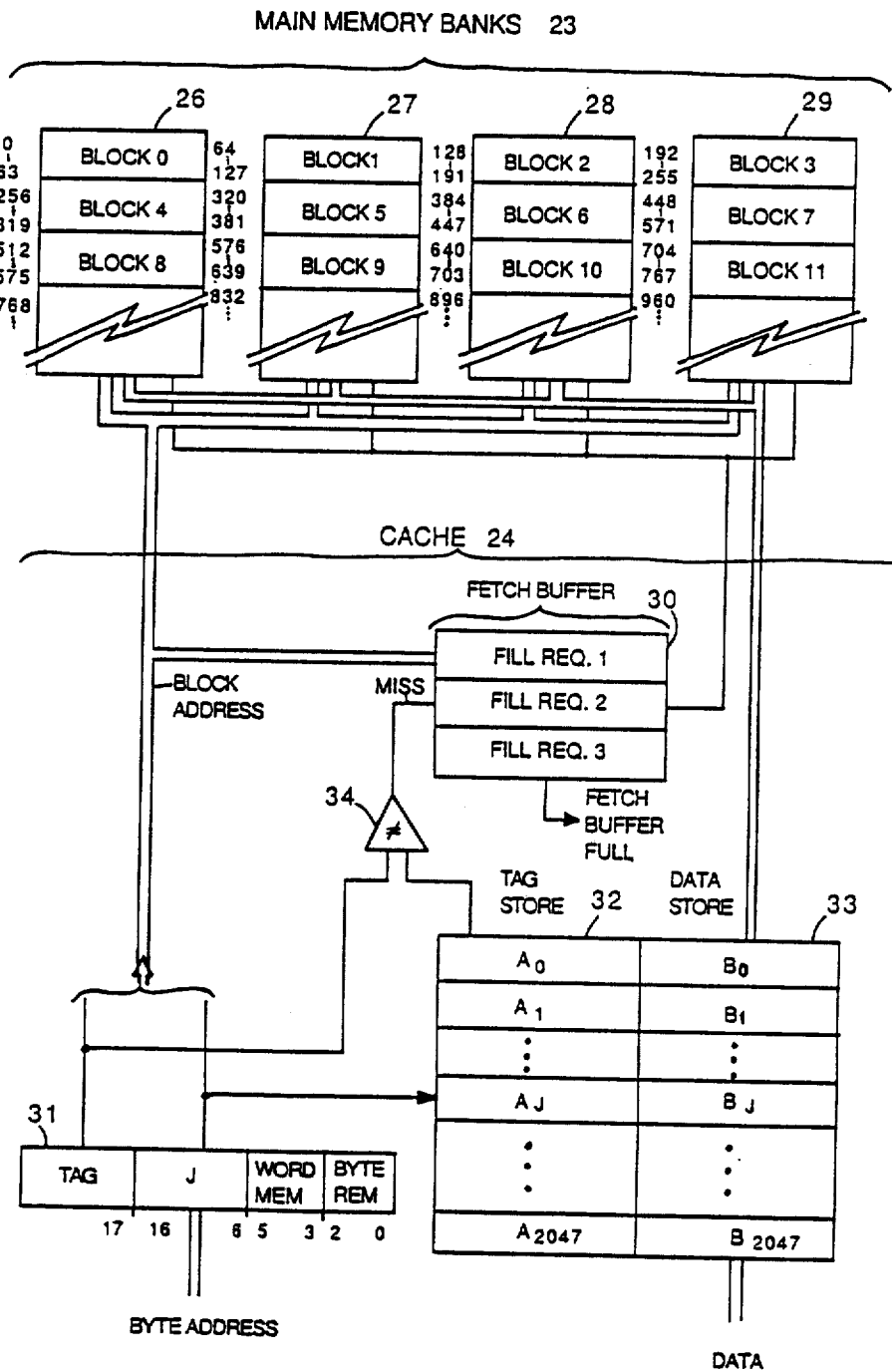
FIG. 2 is a block diagram of a preferred organization for the cache and the main memory used in the digital computer of FIG. 1.

Turning now to FIG. 2, there is shown a block diagram of the preferred organization of the cache 24 and the main memory 23. The main memory 23 is shown with four memory banks generally designated 26, 27, 28 and 29. These memory banks may each store, for example, up to one-half gigabytes. Although the general organization of the main memory 23 is conventional, the memory addresses for the memory banks should be interleaved on block boundaries as illustrated in FIG. 2. The block size, for example, is 64 bytes. A first block (BLOCK 0) has associated byte addresses of 0-63 and is stored in the first bank 26, a second block (BLOCK 1) has associated byte addresses of 64-127 and is stored in the second memory bank 27, the third block (BLOCK 2) has associated byte addresses of 128-191 and is stored in the third memory bank 28, the fourth block (BLOCK 3) has associated byte addresses of 192-225 and is stored in the fourth memory bank 29, the fifth block (BLOCK 4) has associated byte addresses of 256-319 and is stored in the first memory bank 26, and so on. In addition, the main memory 23 is provided with a control circuit which permits a plurality of the memory banks to be accessed simultaneously for obtaining blocks at different byte address ranges.

Block interleaving of the memory bank addresses is useful in practicing the present invention since vectors are conventionally stored and referenced in a linear fashion with respect to the physical addresses of the bytes in the main memory. When a vector extends across one or more block boundaries, it is desirable for multiple ones of the contiguous blocks to be simultaneously accessed in the main memory 23. This permits, for example, the average memory access rate for the data blocks to exceed a multiple of the access rate for any individual memory bank. In the case of four memory banks as shown in FIG. 2, it is desirable to permit at least three memory banks to be accessed simultaneously.

As shown in FIG. 2, the cache 24 is conventional except for the fact that it is provided with a fetch buffer 30 which indicates which of the main memory banks are currently being accessed. When the fetch buffer 30 is full, for example, a signal is generated which causes any additional fill requests to be temporarily suspended. In addition, if a fill request is generated which matches a fill request already in the fetch buffer, then receipt of the fill request is acknowledged without placing an additional fill request in the fetch buffer.

As is conventional, the cache 24 includes an input address register generally designated 31, a tag store generally designated 32, and a data store generally designated 33. The data store 33 is organized for storing selected ones of the predefined blocks of the data elements. In order to indicate whether data for a specified block are stored in the data store 33, the tag store 32 is organized for storing respective tags associated with the blocks. The cache 24 further includes means such as a comparator 34 for checking whether data for a specified block is stored in the cache memory.

As specifically shown in FIG. 2, the tag comprises the upper portion of the block address. In response to a fill request, an addressed block in the main memory is transferred to one or more predefined slots in the data store 33. The slots associated with a given block are indexed by an index j. The index j and the tag for a particular block specifies the block address for that block. Therefore, when an address of a desired byte is received in the input register 31, the index portion j points to at least one corresponding slot in the tag store 32 and the addressed tag is fed to the comparator 34 for comparison with the tag specified by the byte address.

If the comparator 34 detects coincidence, a "hit" is indicated signalling that the desired byte is included in the block in the data store 33 which is indexed by the index j. Otherwise, the comparator 34 indicates a "miss" and causes a corresponding fill request to be placed in the fetch buffer 30 unless the fetch buffer already includes the required fill request. If a fill request is placed in the fetch buffer 30, the fill request is transmitted to the corresponding one of the four memory banks 26-29 which stores the blocks specified by the block address from the input register 31.

As further illustrated in FIG. 2, the tag store 32 and data store 33 include 2048 or 2K different slots which are specified by an index j having eleven binary bits. These binary bits are located at bits 6 to 16 of the byte address. The bits 0-5 of the byte address specify the particular position of the byte in the block addressed by the input register 31. Typically each data element includes eight contiguous bytes forming a "quad word." The position of the byte in a quad word is specified by a "byte remainder" including bits 0-2 of the byte address. The position of the quad word in a block is indicated by a "quad word remainder" specified by bits 3-5 of the byte address.

Figure 3:
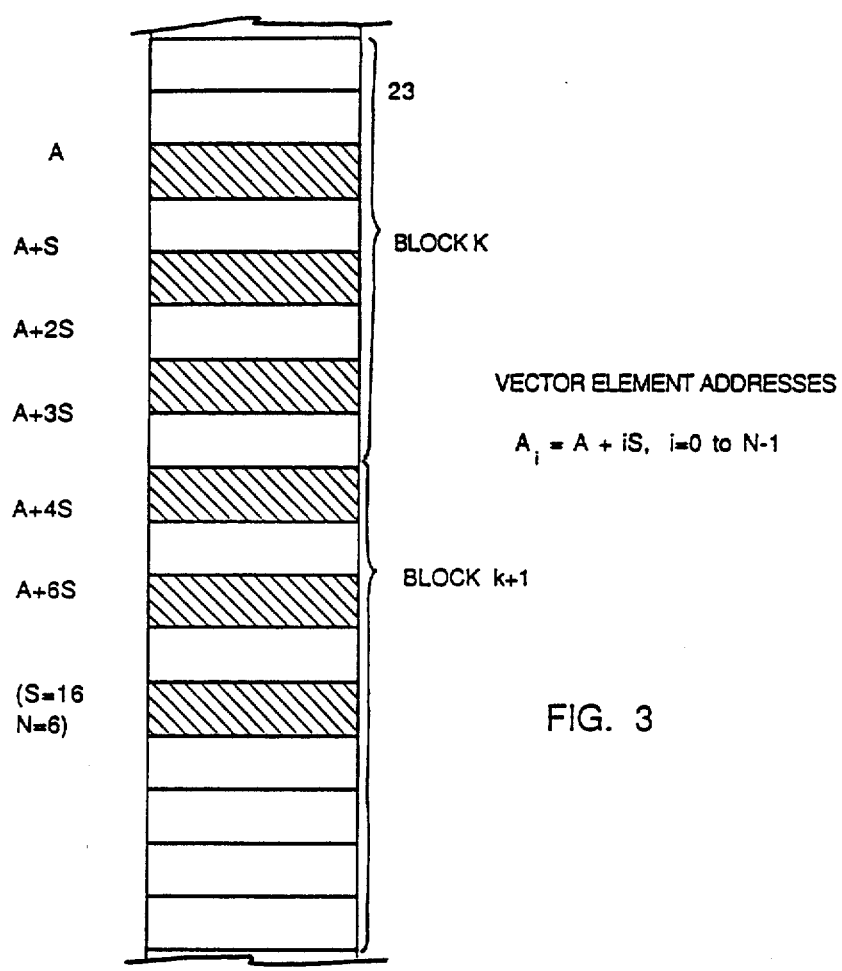
FIG. 3 is a diagram showing a vector having been stored in main memory.

Turning now to FIG. 3, there is shown a vector including five elements stored in consecutive blocks k and (k+1) in the main memory 23. The vector is shown having five elements and extending across the boundary between the two blocks. Moreover, the vector is shown having a "stride" (S) of 16. The "stride" (S) is defined as the difference between the byte addresses of adjacent vector elements. The stride (S) could be the same as the number of bytes per vector element. In this case, there are no "gaps" in memory between the adjacent vector elements. But in other cases, for example when referencing both the row vector and column vector of a matrix, it is desirable to handle vectors having different strides.

In general the with vector element ($A_i$) is located at an address of $A + iS$ where A is the byte address of the vector, and the index i ranges from 0 to $N-1$, where N denotes the number of elements in the vector. The byte address (A) of the vector is defined as the address of the first element. It should be noted, however, that the stride (S) could be a negative number, meaning that the address of the vector is the address of the vector element having the highest byte address, rather than the lowest address.

Figure 4:
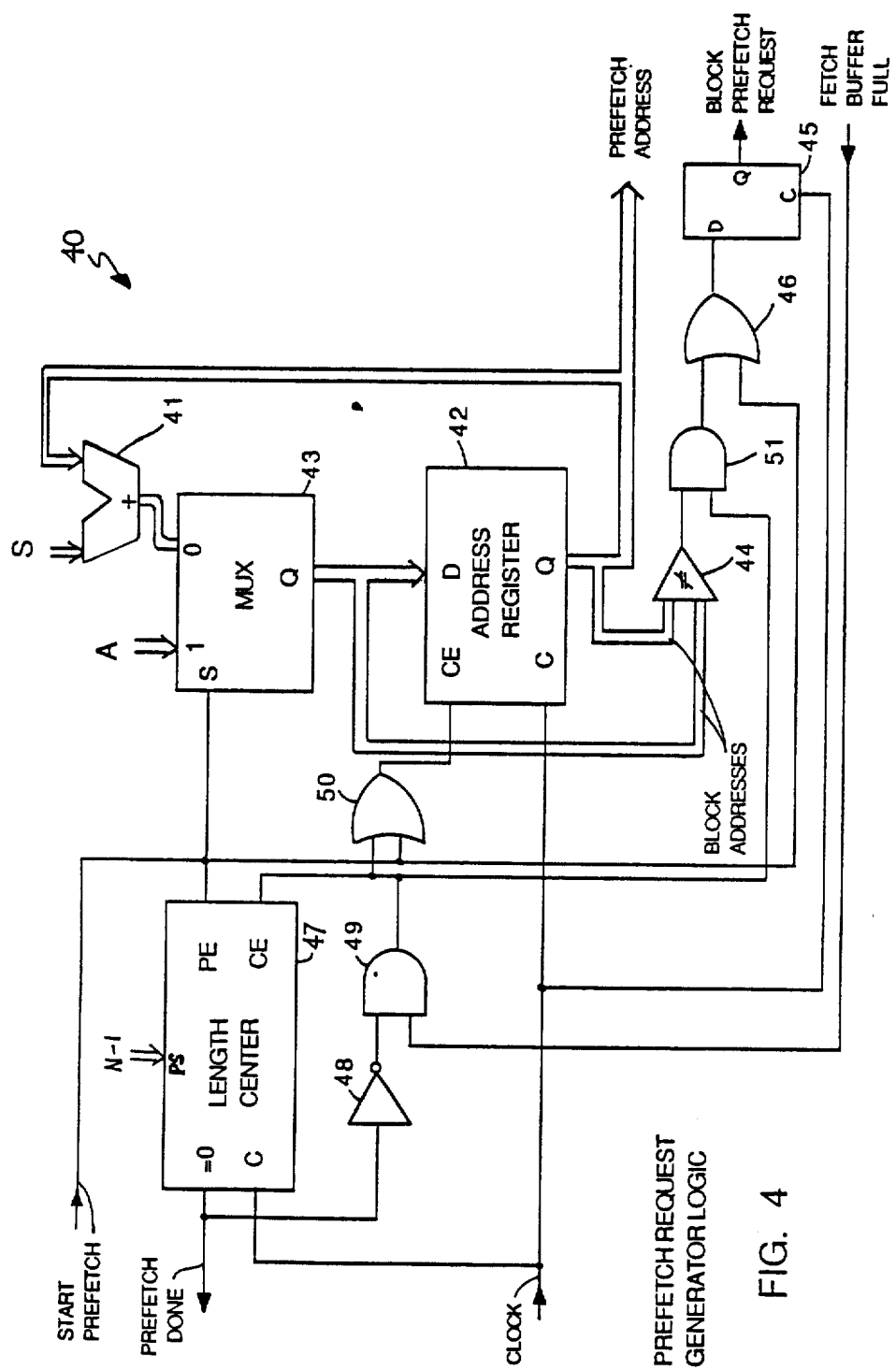
FIG. 4 is a schematic diagram of a logic circuit which could be used for generating prefetch requests in accordance with the present invention.

Turning now to FIG. 4, there is shown a schematic diagram of a synchronous logic circuit generally designated 40 which could be used for the prefetch generator 25 of FIG. 1. The logic circuit 40 determines the blocks of data which include at least one data element of a given vector by sequentially computing the addresses associated with each of the successive data elements of the vector, and testing whether each computed address is within a different block from the previously computed address. For computing the addresses of the vector elements, the circuit 40 includes a binary adder 41 and an address register 42. The adder 41 adds the current address in the address register 42 to the stride (S) to determine the next address. In order to load the address register 42 with the initial vector A, there is provided a multiplexer 43 which selects either the initial address A or the output of the adder 41 and feeds the selected value to the data input of the address register 42. The most significant bits of the address in the address register 42 specify a block address which is used as the prefetch address for the block prefetch requests.

In order to test whether the computed address from the multiplexer 42 is different from the previously computed address in the address register 42, the logic circuit 40 includes a numerical comparator 44. The output of the comparator 44 is sampled by a delay flip-flop 45 to provide the block prefetch request signal. In order to immediately generate an initial block prefetch request for the initial vector address (A), the circuit 40 includes an OR gate 46 which also activates the flip-flop 45 in response to a START PREFETCH signal. The START PREFETCH signal is also fed to the select input of the multiplexer 43 in order that the address register 42 is initially loaded with the vector address (A).

In order to terminate block prefetching when all of the vector address have been computed in the address register 42, there is provided a length counter 47 which indicates the number of remaining vector elements to be computed. The length counter 47 is initially loaded with one less than the number N of vector elements in response to the START PREFETCH signal. The length counter 47 counts down by one during each address computation. Therefore, the prefetch is finished when the length counter 47 counts down to zero. An "equal zero" output of the counter 47 is fed to an inverter 48 to provide a signal for inhibiting the counting of the length counter 47, the computing in the address register 42, and the issuing of prefetch requests by the flip-flop 45. Such a signal should also be generated when the fetch buffer is full, and for this purpose there is provided an AND gate 49 which combines the FETCH BUFFER FULL signal with the output of the inverter 48.

The initial loading of the address register 42 must occur at the start of prefetch, regardless of the state of the length counter. Therefore, a clock enable signal for the address register 42 is provided by an OR gate 50 which combines the output of the gate 49 with the START PREFETCH signal. It is also desirable to use a simple ungated flip-flop for the flip-flop 45, and this can be done by provided an AND gate 51 to gate the output of the comparator 44 with the output of the AND gate 49.

A disadvantage of the circuit 40 in FIG. 4 is that the address of each vector element is computed. If the stride (S) is relatively small compared to the number of vector elements per block, there could be a considerably long delay between each of the prefetch requests. For the vector in FIG. 3, for example, there will be a delay of three clock cycles between the initial fetch request for BLOCK k and the fetch request for BLOCK k+1. For vector data structures which extend across more than one block boundary, the delay between fetch requests is determined by the number of vector elements per block.

It is possible to reduce the delay between the prefetch requests by using a method for computing the addresses of the blocks to be fetched which does not necessarily compute the address of each vector element, but instead only computes the address of every M vector elements where the integer M is selected in accordance with the value of the stride (S). This can be done, for example, by choosing the value of M to be one if the magnitude of the stride (S) is greater than half of the number of bytes per block, selecting the integer M to be two if the magnitude of the stride (S) is less than or equal to one-half but greater than one-quarter of the number of bytes per block, selecting the integer M to be four if the magnitude of the stride (S) is less than or equal to one-quarter but greater than one-eighth of the number of bytes per block, etc. In a specific case, there will be a limited number of multiplication factors M depending upon the maximum number of vector elements that can be stored per block.

Figure 5:
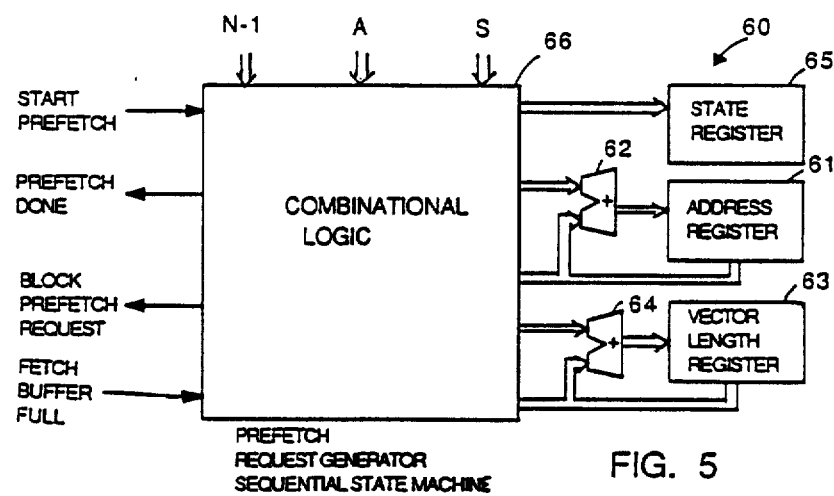
FIG. 5 is a block diagram of an alternative circuit which uses a sequential state machine for generating vector prefetch requests in accordance with the present invention.

Turning now to FIG. 5, there is shown a prefetch request generator generally designated 60 in the form of a sequential state machine for computing and testing the vector addresses in accordance with an integer M selected in accordance with the magnitude of the stride (S). The sequential state machine 60 includes an address register 61 and an adder 62 for computing the addresses of certain ones of the vector elements. The sequential state machine 60 further includes a vector length register 63 which is analogous to the length counter 47, but because the number of vector elements which are computed depends on the stride (S), the vector length register should be changed in accordance with the selected value of M. For this purpose there is provided a second adder 64 which is used for decrementing the value stored in the vector length register 63 by the value of M. In order to indicate the state of the sequential state machine, there is provided a state register 65, and combinatorial logic 66 which operates the adders 62 and 64 in accordance with the inputs and outputs in the present state of the state register 65, and which also determines the next state for the state register 65 in accordance with the present state of the machine and its inputs and outputs.

Figure 6:
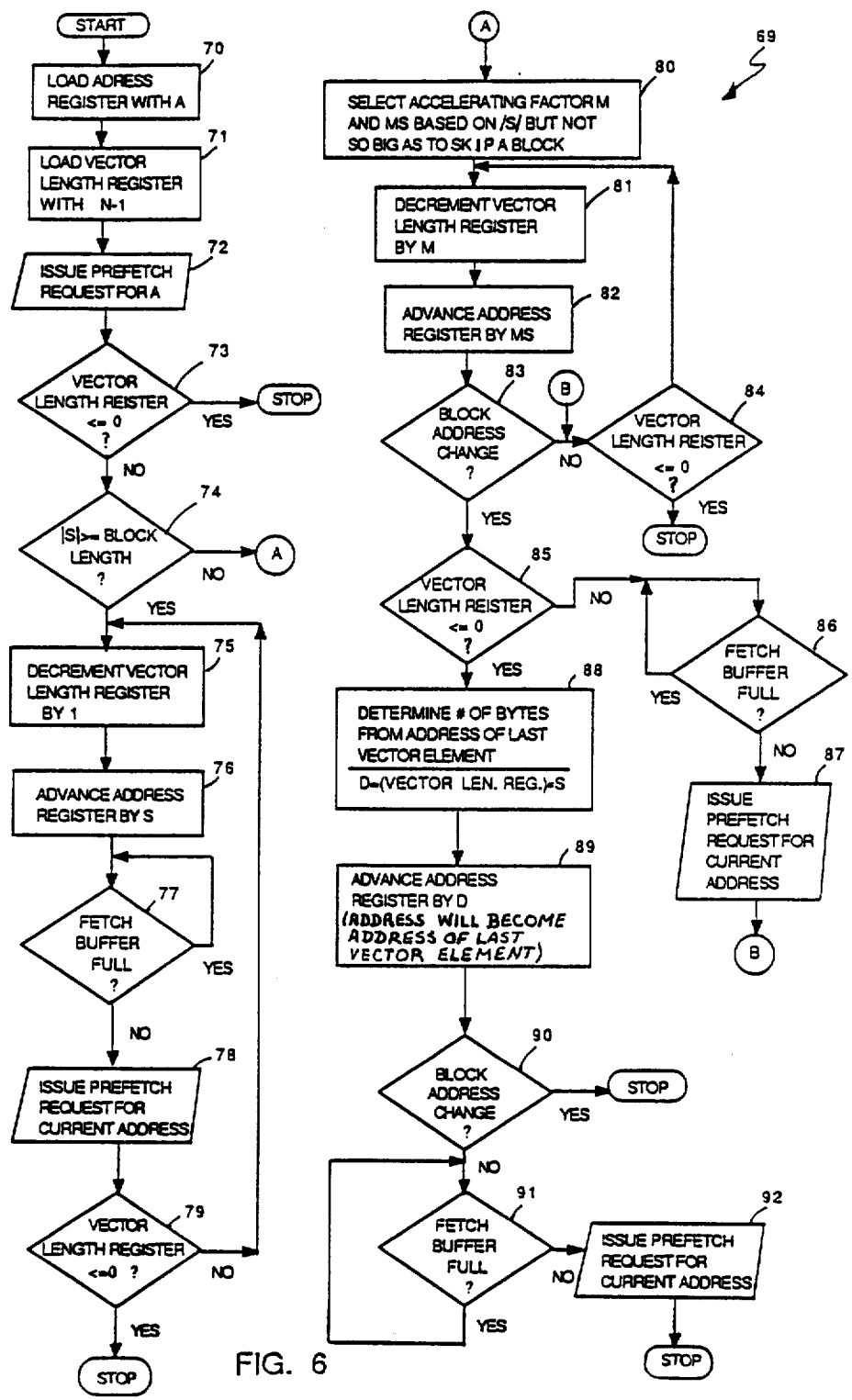
FIG. 6 is a flowchart which defines the combinatorial logic used in the sequential state machine of FIG. 5.

Turning now to FIG. 6, there is shown a flowchart generally designated 69 which defines the combinatorial logic 66 of FIG. 5. In response to a START PREFETCH signal, in step 70 the address register (61 in FIG. 5) is loaded with the vector starting address (A), and in step 71, the vector length register (63 in FIG. 5) is loaded with the value of N−1. Next, in step 72 a prefetch request is issued for the address A. The prefetch is finished if N−1 equals zero, as tested in step 73. Otherwise, there are additional vector elements which might require prefetch requests. In this case, the magnitude of the stride (S) is compared to the block length to decide whether a prefetch request should be issued for each and every other vector element, when the magnitude of the stride is greater or equal to the block length, or for only certain ones of the vector elements, when the magnitude of the stride (S) is less than the block length.

If the magnitude of the stride is greater than or equal to the block length, then the sequential state machine 60 merely calculates the address of each vector element and issues a prefetch request for each computed address. Specifically, in step 75 the vector length register is decremented by one, and in step 76 the address register is advanced by the stride (S). In step 77 the state of the machine does not advance when the fetch buffer is full. Otherwise, in step 78 a prefetch request is issued for the current address. Finally, in step 79 the process is repeated for the next vector element unless the vector length register is less than or equal to zero. In this case, the prefetch is finished.

If the magnitude of the stride (S) is less than the block length, then a somewhat different procedure is used in order to determine whether the address of the next vector element falls within the same or the next block. To test whether the address is either within the same or the next block, it is not necessary to compare the previous block address to the current block address, since it is known that the block address can only change by the value of one. Therefore, the change in the block address can be detected merely by detecting a change in the least significant bit of the block address, or equivalently by detecting whether there is a "carry-out" into this bit position.

In order to speed up the issuance of prefetch requests, the accelerating factor or integer M is selected based on the magnitude of the stride (S). In general, the integer M is selected so as to be as large as possible, but not so big so as to skip a block. As noted above, the accelerating factor M is preferably selected based on whether S falls within certain binary fractions of the number of bytes per block. The accelerating factor M can be determined based on the magnitude of the stride (S) by inspecting the binary bits of the stride (S). The binary bits can be inspected, for example, by a logic circuit or by shifting the bits from a shift register.

For the circuit shown in FIG. 2, for example, the accelerating factor M can have a value of one, two, four or eight which is a rather minimal set of possibilities. When the accelerating factor M is selected, the product MS is also determined in order to decrement the vector address register by this amount when a new vector element address is computed. Again, for a specific example such as FIG. 2, there will be a rather minimal set of possibilities for the product MS. These possibilities can be further limited by requiring the vector elements to reside on long word or quad word boundaries. In the quad word case, for example, the stride (S) can be restricted to the values of 8, 16, 24, 32, 40, 48 or 56 bytes, and therefore the product MS will be either 40, 48, 56 or 64. The selecting is therefore easily performed in step 80, according to:

| |S| | M | |MS| |
|---|---|---|
| 8 | 8 | 64 |
| 16 | 4 | 64 |
| 24 | 2 | 48 |
| 32 | 2 | 64 |
| 40 | 1 | 40 |
| 48 | 1 | 48 |
| 56 | 1 | 56 |

In step 81 the vector length register is decremented by the integer M, and in step 82 the address register is advanced by the product MS. In step 83 a block address change is detected, for example, by inspecting the carry-out into the least significant bit of the block address. If the block address does not change, then in step 84 the vector length register is inspected, and if it has a value less than or equal to zero, the prefetch is finished. Otherwise, the vector length register is again decremented in step 81 and the address register is advanced in step 82 until either the prefetch is finished or the block address changes Once the block address changes, then in step 85 the value in the vector length register is compared to zero to determine whether the computed address is at the end of the vector or has exceeded the end of the vector. If the value in the vector length register is not less than or equal to zero, there is a vector element at the new block address, and therefore if the fetch buffer is not full, as tested in step 86, then in step 87 a prefetch request is issued for the current address and the sequential state machine continues in step 84.

If in step 85 it was determined that the value in the vector length register was less than or equal to zero, then the last element of the vector either may or may not have a block address as indicated by the address register If the last vector element is in the block indicated by the address register, then a final prefetch request must be issued; otherwise, the prefetch is finished. To determine which one of these conditions holds, it is necessary to adjust the address register to determine the address of the last vector element. To do this, the displacement or number by bytes from the address of the last vector element to the address of the address register is determine in step 88 by determining the product of the remainder value in the vector length register and the stride (S). It should be noted, however, that this displacement (D) will have a limited set of possible values in any particular case, so that it is readily determined by a logic circuit or look-up table.

In step 89 the address register is advanced by the displacement (D) so that the address will become the address of the last vector element. The prefetch is then finished or a final prefetch command is issued depending upon whether a block address change occurs due to the advance of the address register, as tested in step 90. As before, the block address change is indicated by a change in the least significant bit of the block address, or alternatively by a carry-out into this bit position. If a block address change occurs, then the prefetch is finished. Otherwise, when the fetch buffer is not full as tested in step 91, a final prefetch request is issued in step 92.

The flowchart in FIG. 6 can be converted to a present-state next-state table and the combinatorial logic 66 for the sequential state machine determine by standard techniques. According to the standard techniques, the steps in the flowchart 69 of FIG. 6 are group and assigned sequential states for the present-state next-state table. Alternatively, the control method illustrated by the flowchart 69 in FIG. 69 could be implemented by execution of a stored program.

Figure 7:
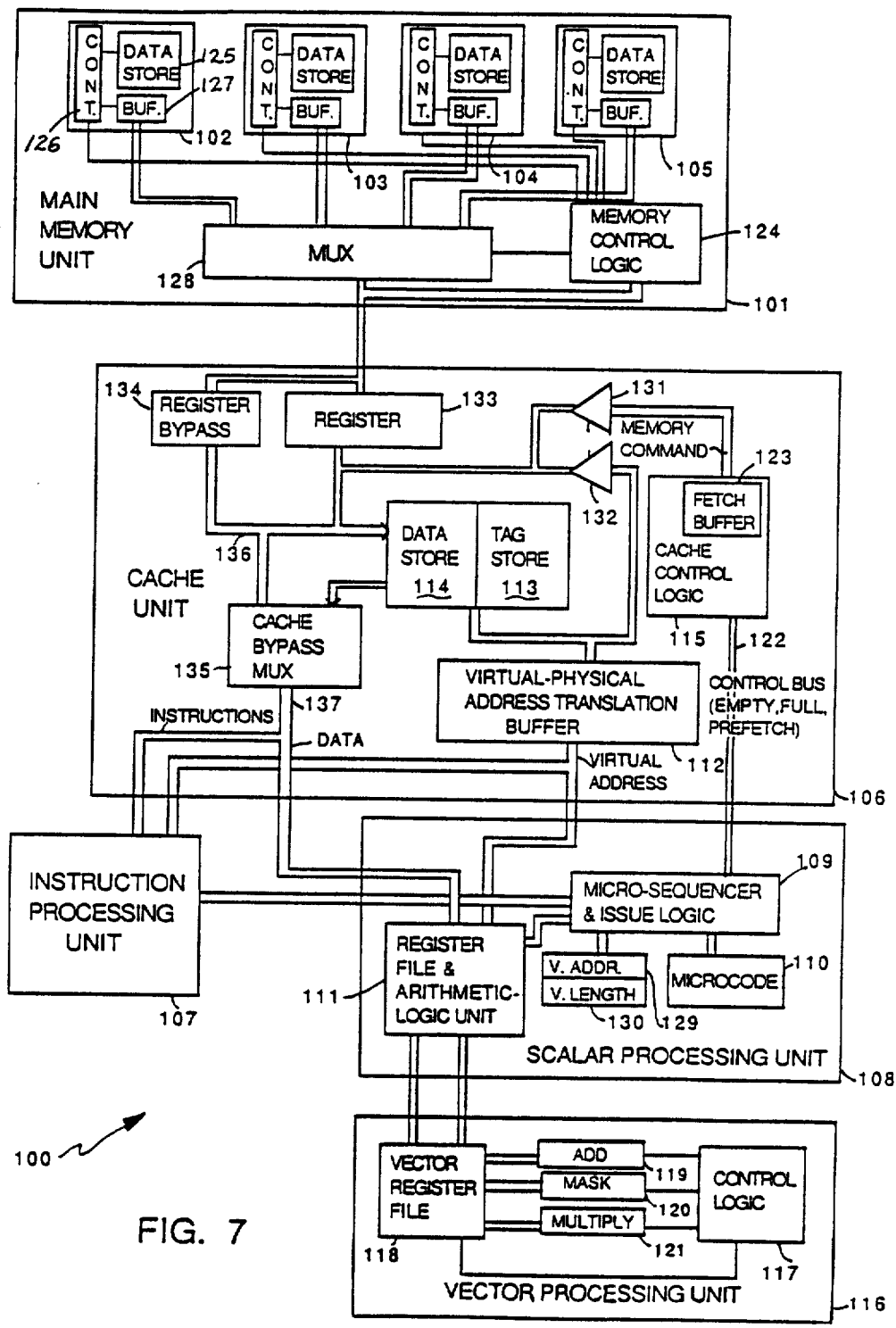
FIG. 7 is a preferred embodiment of the present invention which uses microcode in a scalar processing unit to generate vector prefetch requests for an associated vector processing unit.

Turning now to FIG. 7, there is shown a block diagram of a digital computing system 100 which executes microcode to perform vector prefetching in accordance with the present invention. The system includes a main memory unit 101 including four separate data banks 102, 103, 104, 105 for storing data and program instructions. The memory banks of the main memory unit 101 are organized as shown in FIG. 2 for storing 64 byte blocks of data at interleaved memory addresses. The digital computing system 100 also includes a cache unit 106 which is similar to the cache 24 of FIG. 2.

Program instructions are fed from the cache unit 106 to an instruction processing unit 107 which parses the instructions and sends instruction data to a scalar processing unit 108. Specifically, the scalar processing unit includes a micro-sequencer and issue logic 109 which executes prestored microcode 110 to interpret and execute the parsed instructions from the instruction processing unit 107. These instructions include scalar instructions which the micro-sequencer and issue logic executes by operating a register file and an arithmetic logic unit 111. These scalar instructions include, for example, an instruction to fetch scalar data from the cache unit 106 and load the data in the register file 111.

A scalar load instruction includes a "virtual address" which is translated to a "physical address" by a virtual-to-physical address translation buffer 112 in the cache unit 106. The physical addresses correspond to the byte addresses in the main memory unit 101. The virtual addresses correspond to a wider range of addresses which are specified by the program instructions.

To obtain data at a physical address specified by the virtual-to-physical address translation buffer 112, the cache 106 includes a tag store 113 and a data store 114. A portion of the physical address specifies a tag for the desired data, and cache control logic 115 determines whether a respective tag is included in the tag store 113. If so, the desired data is obtained from the data store 114. Otherwise, the control logic 115 issues a fill request to the main memory unit 101 in order to obtain a data block including the addressed data, and to transfer that data block to the data store.

The above-described operation of the scalar processing unit 108 is similar to the operation of a conventional digital computer such as a "VAX" brand computer.

It is desirable to use a main memory unit 101, cache unit 106, instruction processing unit 107, and scalar processing unit 108 as described above for also executing vector instructions. For this purpose the digital computer system 100 is provided with a vector processing unit 116. The vector processing unit includes control logic 117, a vector register file 118 for storing vector data, a vector adder 119, a vector mask unit 120 and a vector multiplier 121. The vector mask unit 120 includes a mask register for storing a mask bit corresponding to each vector element; the mask bits can be used for controlling the writing into their respective vector elements. The control logic 117 schedules the activity in the vector processing unit 116 in response to commands from the scalar processing unit 108. The scalar processing unit 108 sends these commands to the vector processing unit when the micro-sequencer and issue logic 108 interprets a vector instruction from the instruction processing unit 107.

In accordance with the present invention, it is desirable to use the cache unit 106 as a data store for vector data as well as scalar data. Moreover, it is desirable to use a cache unit 106 that has been designed especially for the scalar processing unit 108. As set out above, these objective can be met by transmitting block prefetch requests to the cache unit 106 in response to a vector load instruction. As shown in FIG. 7, the prefetch requests are issued by the micro-sequencer and issue logic 109 and are transmitted over a control bus 122 to the cache control logic 115.

If the desired data block is not stored in the data store 114, the control logic issues a fill request to the main memory unit 101, and the outstanding fill requests are noted in a fetch buffer 123. The main memory unit 101 includes memory control logic 124 which passes each fill request to the particular memory bank 102, 103, 104, 105 which stores the requested data block. Moreover, the memory control logic 124 permits at least three of the memory banks to be simultaneously processing a fill request.

In order for each data bank to independently and simultaneously process its respective fill request, each bank includes a data store 125, control logic 126, and a buffer 127. Once the memory bank has completed a fill request and its buffer is filled with the requested block, the memory control logic 124 activates a multiplexer 128 to provide a data path from the memory bank to the cache unit 106. The data block is then stored in the data store 114, and a corresponding tag is stored in the tag store 113. Therefore, the data store of the cache unit 106 will be provided with the data blocks which include the vector elements needed by the vector processing unit 116.

In response to a vector load instruction, the microsequencer and issue logic 109 executes a procedure in the microcode 110 for issuing multiple block prefetch requests. The procedure is similar to the procedure shown in the flowchart 69 of FIG. 6. A listing of the pertinent microcode is included in Appendix I to the present specification. In order to execute this procedure, the scalar processing unit 108 includes a vector address register 129 and a vector length register 130. During execution of the prefetch procedure, the micro-sequencer and issue logic tests signals received from the control bus 122 which indicate whether the fetch buffer 123 is empty or full.

It could be possible to use the empty signal to determine whether the first few elements of a vector are stored in cache by testing the empty signal after prefetch requests have been issued for the first few elements. If the fetch buffer is empty at this time, then it may be desirable to stop issuing the prefetch requests under the assumption that all of the vector will most likely be in the cache, and therefore some time would be save by terminating the prefetch process.

In accordance with an additional feature of the present invention, the cache unit 106 is provided with bypasses which speed the transfer of data from the main memory unit 101 to the vector processing unit 116 when desired vector element data are not found in the data store 114, and consequently have to be fetched from the main memory unit 101. The cache unit 106 includes a number of busses and gates which control the passage of data from one bus to another. These gates include a gate 131 for transmitting memory commands from the cache control logic 123 to the main memory unit 101, and a gate 132 for passing physical addresses from the virtual-to physical address translation buffer 112 to the main memory unit 101.

The cache unit 106 is also provided with a register 133 and a register bypass 134 between the data store 114 and the main memory unit 101. The register 133 and register bypass 134 provide additional flexibility in the transfer of data from the main memory unit 101 to the cache unit 106. It is also advantageous to provide a cache bypass multiplexer 135 which permits data to be transferred to the scalar processing unit 108 or the vector processing unit 116 at the same time that it is being written into the data store 114. In other words, the cache control logic 115 activates the cache bypass multiplexer 135 to transfer data from an internal bus 136 to an output bus 137 whenever the physical address of data being written to the data store 114 matches the physical address corresponding to a virtual address desired by the scalar processing unit 108 or the vector processing unit 116. The cache bypass multiplexer 135 therefore eliminates in this case the delay that would be required to read the desired data out of the data store 114.

In view of the above, there has been described a digital data processing system which has a cache and main memory suitable for both vector processing and scalar processing. A prefetch request generator is provided for prefetching blocks of data prior to the request of individual vector elements to ensure that the required data is obtained as soon as possible for use by the vector processor. The vector prefetch method permits a vector processing unit to be easily added to a digital computer having a scalar processing unit with minimal modification of the hardware in the main memory and the cache. Moreover, in a computing system including a scalar processor unit which executes microcode, the vector prefetch method is easily implemented by a microcode procedure for interpreting a vector load instruction.

APPENDIX I.

VECTOR LOAD INSTRUCTION- MICROCODE

Copyright © 1987 Digital Equipment Corporation

```
;----------------------------------------;
.TOC      *              VLDQ INSTRUCTION"
;ENTRY
188:
VE.VLDQ:
          VADRS <- S2.                          ; get out first prefetch
          PREFETCH REQUEST.                     ; check first cache entry
          VAREG+RF[TEMPO] <- OP[B] B[S2].       ; save base address
          TRAP ON [VBOX_EXCEPTION].             ; check if OK
          R <- SHF[AZ] A[S1] LIT[O].            ; save control word
          SEL S1[.FFFFFFC0]

;----------------------------------------;
          SET FPD.                              ; to reset vbox on faults
          RF[TEMP2] <- OP[A.AND.B] A[S1] B[VA]. ; put address
          TRAP ON [VBOX_EXCEPTION].             ; check if OK
          VAREG <- SHFZB B[VA] LIT[10].         ; shift for block align
          SEL S1[TEMP2] S2[VBOX_LENGTH]

;----------------------------------------;
          TRAP ON [VBOX_EXCEPTION].             ; check if OK
          VBREG <- PASS [S1].                   ; set up for next prefetch
          RF[TEMP4] <- OP[A] A[R].              ; save control
          R <- SHFZB B[S2] LIT[20].             ; get length
          SEL S1[SPTR] S2[.8]

;----------------------------------------;
          RF[TEMP1] <- SHF[AZ] A[S1] LIT[O].    ; save stride
          TRAP ON [VBOX_EXCEPTION].             ; check if OK
          NODEST <- OP[A-B] A[S1] B[S2].        ; check for stride 8
```

```
           SEL S2[.7],
           BRANCH ON [S2B.NE0.0],            ; check length
           GO TO [VE.VLDQE1]

;------------------------------;
=011
VE.VLDQE1:                                   ; all done
           UNSUSPEND IBOX,
           RF[TEMP0] <- OP[ZERO],            ; retire cycle
           GO TO [VE.VLDL.END1]

;------------------------------;
                                             ; real work to do
           CNT <- COP[SHF_CNT] [R],          ; put length away
           VAREG <- OP[NOT.A.AND.B] A[VA] B[S2],  ; check block alignment
           SEL S1[TEMP4] S2[VBOX_BLK],
           BRANCH ON [S1.GTR.3F],            ; check if one per block
           GO TO [VE.VLDQPA]

;------------------------------;
=101
VE.VLDQPA:                                   ; we have more than one per block
           VBREG <- VOP[ADD64] V[VB],        ; next prefetch
           LOAD VADRS FROM [VA_ALU],         ; for prefetch
           PREFETCH REQUEST,                 ; prefetch while waiting
           CNT <- COP[CNT-1],                ; decrement data count
           VAREG <- SHF A[VA] B[S2] LIT[19], ; get ready for block read
           SEL S1[TEMP4],                    ; for next dispatch
           BRANCH ON [Z],                    ; check if stride 8
           GO TO [VE.VLDQP1]

;------------------------------;
                                             ; we have one quad per block
                                             ; or a negative stride
           RF[VBOX_COM] <- VBOX OPCODE[LDQ], ; send opcode to vbox
           VBOX <- OP[A] A[S1],              ; send control to vbox
           DECODE OPCODE WITH DATA,          ; vbox decodes the opcode
           CONTROL[VLD_VST_IOTA],            ; send ctl to vbox
           TRAP ON [VBOX_EXCEPTION],         ; check if OK
           SEL S1[TEMP0] S2[TEMP1],          ; get adr and stride
           BRANCH ON [SHF.N],                ; check sign of stride
           GO TO [VE.VLDQPA1]

;------------------------------;
=110
VE.VLDQPA1:                                  ; positive stride
           VBOX <- OP[B] B[S2],              ; send stride to vbox
           RF[VBOX_COM] <- PASS VBOX SCALAR A[S1], ; send base adr to vbox
           PUT IBOX IN VBOX MODE,            ; set to recieve addresses
           SEL S1[TEMP2] S2[TEMP1],
           GO TO [VE.VLDQPA2]

;------------------------------;
                                             ; negative stride
           VBOX <- OP[B] B[S2],              ; send stride to vbox
           RF[VBOX_COM] <- PASS VBOX SCALAR A[S1], ; send base adr to vbox
           PUT IBOX IN VBOX MODE,            ; set to recieve addresses
           SEL S1[TEMP1] S2[VBOX_LENGTH],    ; stride
           GO TO [VE.VLDQPA2A]

;------------------------------;
VE.VLDQPA2A:                                 ; stride negative
           RF[TEMP5] <- OP[NEG.A] A[S1],     ; for check of size
           R <- SHFZB B[S2] LIT[20],         ; save length
           SEL S1[TEMP5]                     ; for check of stride size ;------------------------------;
           VAREG <- SHF[AZ] A[S1] LIT[3D]    ; for branch check ;------------------------------;
           CNT <- COP[SHF_CNT] [R],          ; load length
           VAREG <- OP[A+1] A[R],            ; for decrements
           SEL S1[TEMP2] S2[TEMP1],
           BRANCH ON [S1.GTR.3F],            ; check if one per block
           GO TO [VE.VLDQPA2B]

;------------------------------;
```

```
=101
VE.VLDOPA2B:                                    ; more than one per block
        SEL S1[.FFFFFFC0],                      ; for prefetch stride
        BRANCH ON [VA2+VA1+VA0],
        GO TO [VE.VLDOP1B]

;------------------------------------;
                                             ; one per block
        RF[TEMP2] <- OP[A+B] A[S1] B[S2],       ; compute next address
        VAREG <- READ SHF_CNT [CNT],            ; load count into VA
        GO TO [VE.VLDOP2A1]

;------------------------------------;
VE.VLDOPA2:
        RF[TEMP2] <- OP[A+B] A[S1] B[S2],       ; compute next address
        CNT <- COP[SHF_CNT] [R],                ; load value
        GO TO [VE.VLDOP2]

;------------------------------------;
=*0*
VE.VLDOP1:                                      ; stride between 8 and 64
                                                ; no block moves
        RF[VBOX_COM] <- VBOX OPCODE[LDQ],       ; send opcode to vbox
        VBOX <- OP[A] A[S1],                    ; send control to vbox
        DECODE OPCODE WITH DATA,                ; vbox decodes the opcode
        CONTROL[VLD_VST_IOTA],                  ; send ctl to vbox
        TRAP ON [VBOX_EXCEPTION],               ; check if OK
        SEL S1[TEMP0] S2[TEMP1],                ; get adr and stride
        GO TO [VE.VLDOP1A]

;------------------------------------;
                                                ; do block reads
        RF[VBOX_COM] <- VBOX OPCODE[BLK_LDQ],   ; send opcode to vbox
        VBOX <- OP[A] A[S1],                    ; send control to vbox
        DECODE OPCODE WITH DATA,                ; vbox decodes the opcode
        CONTROL[VLD_VST_IOTA],                  ; send ctl to vbox
        DECREMENT BLOCK AND PREFETCH,           ; get carries set for branches
        TRAP ON [VBOX_EXCEPTION],               ; check if OK
        SEL S1[TEMP0] S2[TEMP1],                ; get adr and stride
        GO TO [VE.VLDOP3]

;------------------------------------;
VE.VLDOP1A:
                                                ; prefetch based on stride
        VBOX <- OP[B] B[S2],                    ; send stride to vbox
        RF[VBOX_COM] <- PASS VBOX SCALAR A[S1], ; send base adr to vbox
        PUT IBOX IN VBOX MODE,                  ; set to recieve addresses
        SEL S1[TEMP1]                           ; get stride ;------------------------------------;
        VAREG <- SHF[AZ] A[S1] LIT[3D],         ; get the stride for check
        SEL S1[VBOX_LENGTH]

;------------------------------------;
        CNT <- COP[SHF_CNT] [R],                ; load count
        VAREG <- OP[A+1] A[S1]                  ; save length ;------------------------------------;
        SEL S1[.40],                            ; for prefetch strides
        BRANCH ON [VA2+VA1+VA0],
        GO TO [VE.VLDOP1B]

;------------------------------------;
=000
VE.VLDOP1B:                                     ; decide number of prefetches
                                                ; 1 quad word per block
        VAREG <- SHFZB B[VA] LIT[21],
        SEL S1[TEMP2] S2[TEMP1],                ; send address
        GO TO [VE.VLDOP2AA]

;------------------------------------;
                                                ; 8 quad words per block
        RF[TEMP1] <- OP[A] A[S1],               ; get several blocks
        VAREG <- SHFZB B[VA] LIT[1E],
        SEL S1[TEMP2] S2[TEMP1],                ; send address
        GO TO [VE.VLDOP2AA]

;------------------------------------;
                                                ; 2 or 3 quads per block
        RF[TEMP1] <- OP[A] A[S1],               ; get several blocks
        VAREG <- SHFZB B[VA] LIT[1F],
        SEL S1[TEMP2] S2[TEMP1],                ; send address
        GO TO [VE.VLDOP2AA]
```

```
        ;------------------------------------;
                                             ; 2 quads per block
        RF[TEMP1] <- OP[A] A[S1].            ; get several blocks
        VAREG <- SHFZB B[VA] LIT[20].
        SEL S1[TEMP2] S2[TEMP1].             ; send address
        GO TO [VE.VLDOP2AA]

;------------------------------------;
                                             ; 1 or 2 quads per block
        RF[TEMP1] <- OP[A] A[S1].            ; get several blocks
        VAREG <- SHFZB B[VA] LIT[21].
        SEL S1[TEMP2] S2[TEMP1].             ; send address
        GO TO [VE.VLDOP2AA]

;------------------------------------;
                                             ; 1 or 2 quads per block
        RF[TEMP1] <- OP[A] A[S1].            ; get several blocks
        VAREG <- SHFZB B[VA] LIT[21].
        SEL S1[TEMP2] S2[TEMP1].             ; send address
        GO TO [VE.VLDOP2AA]

;------------------------------------;
                                             ; 1 or 2 quads per block
        RF[TEMP1] <- OP[A] A[S1].            ; get several blocks
        VAREG <- SHFZB B[VA] LIT[21].
        SEL S1[TEMP2] S2[TEMP1].             ; send address
        GO TO [VE.VLDOP2AA]

;------------------------------------;
                                             ; 1 or 2 quads per block
        RF[TEMP1] <- OP[A] A[S1].            ; get several blocks
        VAREG <- SHFZB B[VA] LIT[21].
        SEL S1[TEMP2] S2[TEMP1].             ; send address
        GO TO [VE.VLDOP2AA]

;------------------------------------;
VE.VLDOP2:
        VAREG <- OP[A] A[R]                  ; put count into ;------------------------------------;
VE.VLDOP2A1:
        VAREG <- VSHFL1 VAREG.               ; set up for count
        SEL S1[TEMP2] S2[TEMP1]              ; send address ;------------------------------------;
VE.VLDOP2AA:
        DECREMENT PREFETCH.                  ; get carries set for branches
        RF[TEMP2] <- OP[A+B] A[S1] B[S2].    ; compute next address
        VADRS <- S1.
        PREFETCH REQUEST.                    ; prefetch while waiting
        CNT <- COP[CNT-1].                   ;
        SEL S1[TEMP1] S2[TEMP2]

;------------------------------------;
        DECREMENT PREFETCH.                  ; get carries set for branches
        RF[TEMP2] <- OP[A+B] A[S1] B[S2].    ; compute next address
        VADRS <- S1.
        PREFETCH REQUEST.                    ; prefetch while waiting
        CNT <- COP[CNT-1]                    ;

;------------------------------------;
                                             ; sel sptr, pass data
        CNT <- COP[CNT-1].                   ;
        SEL S1[SPTR] S2[SPTR].               ; get next quad
        BRANCH ON [V_PREFETCH_BLOCK].
        GO TO [VE.VLDOP2B]

;------------------------------------;
=000
VE.VLDOP2B:
                                             ; sel sptr, pass data
        CNT <- COP[CNT-1].
        TRAP ON [VBOX_EXCEPTION].            ; check if OK
        RF[VBOX_DATA] <- PASS VBOX DATA B[S2]. ; send vbox the data
        VBOX <- OP[A] A[S1].                 ; send more data
        SEL S1[SPTR] S2[SPTR].               ; get next quad
        BRANCH ON [V_PREFETCH_BLOCK].
        GO TO [VE.VLDOP2B]
```

```
           ;-------------------------------------;
                                                 ; sel sptr, pass data
        CNT <- COP[CNT-1].                       ;
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        SEL S1[SPTR] S2[SPTR].                   ; get next quad
        BRANCH ON [V_PREFETCH_BLOCK].
        GO TO [VE.VLDOP2B]

;-------------------------------------;
                                                 ; prefetch next
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        SEL S1[SPTR] S2[SPTR].          ; for prefetch
        BRANCH ON [CNT.EQ.0].
        GO TO [VE.VLDOP2C]

;-------------------------------------;
                                                 ; prefetch next
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        SEL S1[SPTR] S2[SPTR].                   ; for prefetch
        BRANCH ON [CNT.EQ.0].
        GO TO [VE.VLDOP2C]

;-------------------------------------;
                                                 ; all done transfer
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        UNSUSPEND IBOX.                          ; restart instruction stream
        GO TO [VE.VLDL.END1]

;-------------------------------------;
=011
VE.VLDOP2C:                                      ; prefetch request
        CNT <- COP[CNT-1].                       ;
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        SEL S1[TEMP1] S2[TEMP2].                 ; for prefetch
        BRANCH ON [CNT.EQ.0].
        GO TO [VE.VLDOP2D]

;-------------------------------------;
                                                 ; all done transfer
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        UNSUSPEND IBOX.                          ; restart instruction stream
        GO TO [VE.VLDL.END1]

;-------------------------------------;
=011
VE.VLDOP2D:
        CNT <- COP[CNT-1].                       ;
        DECREMENT PREFETCH.                      ; get carries set for branches
        RF[TEMP2] <- OP[A+B] A[S1] B[S2].        ; compute next address
        VADRS <- S1.
        PREFETCH REQUEST.                        ; prefetch while waiting
        SEL S1[SPTR] S2[SPTR].
        GO TO [VE.VLDOP2D1]

;-------------------------------------;
                                                 ; all done transfer
        SEL S1[SPTR] S2[SPTR].                   ; for last transfer
        GO TO [VE.VLDOP2G]

;-------------------------------------;
VE.VLDOP2D1:                                     ; not all done
        CNT <- COP[CNT-1].                       ;
        TRAP ON [VBOX_EXCEPTION].                ; check if OK
        RF[VBOX_DATA] <- PASS VBOX DATA B[S2].   ; send vbox the data
        VBOX <- OP[A] A[S1].                     ; send more data
        SEL S1[SPTR] S2[SPTR].                   ; get next quad
        BRANCH ON [CNT.EQ.0].
        GO TO [VE.VLDOP2E]
```

```
                ;------------------------------------;
=011
VE.VLDOP2E:                                           ; sel sptr, pass data
        CNT <- COP[CNT-1].                            :
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        SEL S1[SPTR] S2[SPTR].                        ; get next quad
        BRANCH ON [CNT.EQ.0].
        GO TO [VE.VLDOP2F]

;------------------------------------;
                                                      ; all done transfer
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        UNSUSPEND IBOX.                               ; restart instruction stream
        GO TO [VE.VLDL.END1]

;------------------------------------;
=011
VE.VLDOP2F:                                           ; sel sptr, pass data
        CNT <- COP[CNT-1].                            :
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        SEL S1[SPTR] S2[SPTR].                        ; get next quad
        BRANCH ON [V_PREFETCH_BLOCK].
        GO TO [VE.VLDOP2B]

;------------------------------------;
VE.VLDOP2G:                                           ; all done transfer
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        UNSUSPEND IBOX.                               ; restart instruction stream
        GO TO [VE.VLDL.END1]

;------------------------------------;
VE.VLDOP3:                                            ; here for block reads
        CNT <- COP[CNT-1].                            ; decrement data count
        VBOX <- OP[B] B[S2].                          ; send stride
        RF[VBOX_COM] <- PASS VBOX SCALAR A[S1].       ; send base adr to vbox
        PUT IBOX IN VBOX MODE                         ; set to recieve addresses ;------------------------------------;
        DECREMENT BLOCK.
        CNT <- COP[CNT-1]                             ; to fix increment ;------------------------------------;
VE.VLDOP4:                                            :
        DECREMENT BLOCK.
        CNT <- COP[CNT-1].
        SEL S1[SPTR] S2[SPTR].                        ; get block pointers
        BRANCH ON [V_PREFETCH_BLOCK].                 ; check next transfer
        GO TO [VE.VLDOP5]

;------------------------------------;
=000                                                  ; table for block reads
VE.VLDOP5:                                            ; sel rfptr+2, pass data
        DECREMENT BLOCK.
        CNT <- COP[CNT-1].                            :
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        SEL S1[RFPTR+2] S2[RFPTR+2].                  ; get next quad
        BRANCH ON [V_PREFETCH_BLOCK].
        GO TO [VE.VLDOP5]

;------------------------------------;
                                                      ; sel sptr, pass data
        DECREMENT BLOCK.
        CNT <- COP[CNT-1].                            :
        TRAP ON [VBOX_EXCEPTION].                     ; check if OK
        RF[VBOX_DATA] <- PASS VBOX DATA B[S2].        ; send vbox the data
        VBOX <- OP[A] A[S1].                          ; send more data
        SEL S1[SPTR] S2[SPTR].                        ; get next quad
        BRANCH ON [V_PREFETCH_BLOCK].
        GO TO [VE.VLDOP5]
```

```
;---------------------------------------;
                                         ; prefetch, sel rfptr+2
    DECREMENT BLOCK AND PREFETCH.
    CNT <- COP[CNT-1].                   :
    VBREG <- VOP[ADD64] V[VB].           ; next prefetch
    LOAD VADRS FROM [VA_ALU].            ; for prefetch
    PREFETCH REQUEST.                    ; prefetch while waiting
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[RFPTR+2] S2[RFPTR+2].         ; get next quad
    BRANCH ON [V_PREFETCH_BLOCK].
    GO TO [VE.VLDOP6]

;---------------------------------------;
                                         ; prefetch, sel sptr
    DECREMENT BLOCK AND PREFETCH.
    CNT <- COP[CNT-1].                   :
    VBREG <- VOP[ADD64] V[VB].           ; next prefetch
    LOAD VADRS FROM [VA_ALU].            ; for prefetch
    PREFETCH REQUEST.                    ; prefetch while waiting
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[SPTR] S2[SPTR].               ; get next quad
    BRANCH ON [V_PREFETCH_BLOCK].
    GO TO [VE.VLDOP6]

;---------------------------------------;
                                         ; all done transfer
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    CLEAR EBOX READ FAULT.               ; for case of prefetch fault
    SEL S2[PC_CURRENT].                  ; get for dispatch
    GO TO [VE.VLDOP8]

;---------------------------------------;
*000                                     ; table for block reads
VE.VLDOP6:                               ; sel rfptr+2, pass data
    DECREMENT BLOCK.
    CNT <- COP[CNT-1].                   :
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[RFPTR+2] S2[RFPTR+2].         ; get next quad
    BRANCH ON [V_PREFETCH_BLOCK].
    GO TO [VE.VLDOP7]

;---------------------------------------;
                                         ; sel sptr, pass data
    DECREMENT BLOCK.
    CNT <- COP[CNT-1].                   :
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[SPTR] S2[SPTR].               ; get next quad
    BRANCH ON [V_PREFETCH_BLOCK].
    GO TO [VE.VLDOP7]

;---------------------------------------;
                                         ; prefetch, sel rfptr+2
                          ; we are counting before another prefetch
    DECREMENT BLOCK.                     ; so no prefetch
    CNT <- COP[CNT-1].                   :
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[RFPTR+2] S2[RFPTR+2].         ; get next quad
    BRANCH ON [V_PREFETCH_BLOCK].
    GO TO [VE.VLDOP7]

;---------------------------------------;
                                         ; prefetch, sel sptr
                          ; we are counting before another prefetch
    DECREMENT BLOCK.                     ; so no prefetch
    CNT <- COP[CNT-1].                   :
    TRAP ON [VBOX_EXCEPTION].            ; check if OK
    RF[VBOX_DATA] <- PASS VBOX DATA B[S2]. ; send vbox the data
    VBOX <- OP[A] A[S1].                 ; send more data
    SEL S1[SPTR] S2[SPTR].               ; get next quad
    BRANCH ON [V_PREFETCH_BLOCK].
    GO TO [VE.VLDOP7]
```

```
        ;----------------------------------;
                                           ; all done transfer
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        CLEAR EBOX READ FAULT.             ; for case of prefetch fault
        SEL S2[PC_CURRENT].                ; get for dispatch
        GO TO [VE.VLDOP8]

;----------------------------------;
                                           ; table for block reads
=000                                       ; sel rfptr+2, pass data
VE.VLDOP7:
        DECREMENT BLOCK.
        CNT <- COP[CNT-1].
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        SEL S1[RFPTR+2] S2[RFPTR+2].       ; get next quad
        BRANCH ON [V_PREFETCH_BLOCK].
        GO TO [VE.VLDOP5]

;----------------------------------;
                                           ; sel sptr, pass data
        DECREMENT BLOCK.
        CNT <- COP[CNT-1].
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        SEL S1[SPTR] S2[SPTR].             ; get next quad
        BRANCH ON [V_PREFETCH_BLOCK].
        GO TO [VE.VLDOP5]

;----------------------------------;
                                           ; prefetch, sel rfptr+2
                                ; we are counting before another prefetch
        DECREMENT BLOCK.                   ; so no prefetch
        CNT <- COP[CNT-1].
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        SEL S1[RFPTR+2] S2[RFPTR+2].       ; get next quad
        BRANCH ON [V_PREFETCH_BLOCK].
        GO TO [VE.VLDOP5]

;----------------------------------;
                                           ; prefetch, sel sptr
                                ; we are counting before another prefetch
        DECREMENT BLOCK.                   ; so no prefetch
        CNT <- COP[CNT-1].
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        SEL S1[SPTR] S2[SPTR].             ; get next quad
        BRANCH ON [V_PREFETCH_BLOCK].
        GO TO [VE.VLDOP5]

;----------------------------------;
                                           ; all done transfer
        TRAP ON [VBOX_EXCEPTION].          ; check if OK
        RF[VBOX_DATA] <- PASS VBOX DATA B[S2]. ; send vbox the data
        VBOX <- OP[A] A[S1].               ; send more data
        CLEAR EBOX READ FAULT.             ; for case of prefetch fault
        SEL S2[PC_CURRENT].                ; get for dispatch
        GO TO [VE.VLDOP8]

;----------------------------------;
VE.VLDOP8:                                 ; all done
        RF[MEMWRITE] <- SHFIPR.            ; send address to Ibox
        DISPATCH IBOX.                     ; dispatch to next instr
        GO TO [VE.VLDL.END1]

;----------------------------------;
.TOC    "        VLDO FAULT HANDLER"
```

```
388:
TRP.VLDO:
        RF(VBOX_COM) <- VBOX OPCODE(RESET),    ; reset the vbox
        DECODE OPCODE,
        RESET FPD,                             ; fault not real FPD
        SEL S2(PC_BACKUP),                     ; set up for handler
        GO TO (1E.RET.EXT)

;-----------------------------------------;
```

What is claimed is:

1. A method of operating a digital computer, said digital computer including a vector processor, a main memory, and a cache; said main memory including means for storing data elements at respective addresses; said cache including cache memory means for storing selected predefined blocks of said data elements, means for receiving requests to reference a specified block of said data, means for checking whether data for the specified block is stored in the cache memory means, and means operative when data for the specified block is not so stored for reading the specified block of data from said main memory and storing the block of data in the cache memory means; said method comprising the steps of:

receiving an instruction to obtain a specified vector of said data elements and load said vector into said vector processor, determining the blocks of data which include at least one data element of said vector, and transmitting requests to reference the blocks of data which are determined to include at least one data element of said vector.

2. The method as claimed in claim 1, wherein said means for receiving requests to reference a specified block of said data includes means for receiving a specified memory address, means for determining the block including the specified address, and means for obtaining the data element associated with the specified address from said memory means when the block including the specified address is stored in said memory means and otherwise obtaining the data element from the main memory, and wherein said method further comprises the steps of determining the memory address associated with each of the elements of said vector, transmitting the memory addresses so determined to the cache, and transmitting the data elements associated with the specified addresses from the means for obtaining to said vector processor.

3. The method as claimed in claim 1, wherein said step of determining is performed by executing a microcode procedure.

4. The method as claimed in claim 1, wherein said step of determining the blocks of data which include at least one data element of said vector includes the steps of sequentially computing the addresses associated with successive data elements of the vector, and testing whether each computed address is within a different block from the previously computed address.

5. The method as claimed in claim 4, wherein said addresses associated with successive data elements differ by a predetermined stride, and said step of sequentially computing the addresses associated with successive data elements of the vector computes the address of every Mth data element of the vector, where M is an integer for which different values are selected as a function of said stride.

6. The method as claimed in claim 5, wherein said blocks each have the same predetermined memory size, and said step of sequentially computing includes the step of comparing said stride to said memory size of said blocks.

7. The method as claimed in claim 5, further comprising the step of changing a count by said integer M each time said address of every Mth data element of the vector is computed.

8. The method as claimed in claim 7, further comprising the step of adjusting the address computed for the last Mth data element of the vector by a value which is selected as a function of a remainder of said count and said stride.

9. A method of operating a digital computer, said digital computer including a vector processor, a main memory having multiple memory banks, and at least one data buffer interposed in a data path from said main memory to said vector processor, said memory storing predefined blocks of data elements at respective addresses; said method comprising the steps of:

receiving an instruction to obtain a specified vector of data elements and load said vector into said vector processor, determining the blocks of data which include at least one data element of said vector, transmitting requests to reference the blocks of data which are determined to include at least one data element of said vector, and in response to those requests fetching the blocks from memory when the blocks are not stored in said data buffer, and obtaining from the referenced blocks said data elements of said vector and transmitting said data elements of said vector to said vector processor.

10. The method as claimed in claim 9, wherein said step of transmitting includes the steps of checking whether the referenced blocks of data are stored in said data buffer, and when the reference blocks of data are not found in said data buffer, transmitting respective fetch requests to said main memory.

11. The method as claimed in claim 10, wherein said method further comprises loading said fetch requests into a fetch buffer, and removing said fetch requests from said fetch buffer when their respective blocks of data are fetched from memory.

12. The method as claimed in claim 11, wherein said step of transmitting respective fetch requests is temporarily suspended when the fetch buffer becomes full.

13. The method as claimed in claim 11, wherein said step of transmitting respective fetch requests includes the step of checking whether the fetch buffer already includes the fetch request, and when the fetch buffer is found to already include the fetch request, inhibiting retransmission of the fetch request to the main memory.

14. The method as claimed in claim 11, wherein said step of determining is performed by executing a microcode procedure.

15. The method as claimed in claim 9, wherein said step of determining the blocks of data which include at least one data element of said vector includes the steps of sequentially computing the addresses associated with successive data elements of the vector, and testing whether each computed address is within a different block from the previously computed address.

16. The method as claimed in claim 15, wherein said addresses associated with successive data elements differ by a predetermined stride, and said step of sequentially computing the addresses associated with successive data elements of the vector computes the address of every Mth data element of the vector, where M is an integer for which different values are selected as a function of said stride.

17. The method as claimed in claim 16, wherein said blocks each have the same predetermined memory size, and said step of sequentially computing includes the step of comparing said stride to said memory size of said blocks.

18. The method as claimed in claim 16, further comprising the step of changing a count by said integer M each time said address of every Mth data element of the vector is computed.

19. The method as claimed in claim 18, further comprising the step of adjusting the address computed for the last Mth data element of the vector by a value which is selected as a function of a remainder of said count and said stride.

20. A method of operating a digital computer having a main memory, a cache, a scalar processor, and a vector processor; said memory including means for storing data elements at respective addresses; said cache including cache memory means for storing selected predefined blocks of said data elements, means for receiving requests to reference a specified block of said data, means for checking whether data for the specified block is stored in the cache memory means, and means operative when data for the specified block is not so stored for reading the specified block of data from said main memory and storing the block of data in the cache memory means; said method comprising the steps of:
receiving an instruction to obtain a specified vector of said data elements and load said vector into said vector processor;
determining the blocks of data which include at least one data element of said vector,
transmitting to said cache requests to reference the blocks of data which are determined to include at lest one data element of said vector, and
thereafter transmitting to said cache requests to reference individually said data elements of said specified vector, and
transmitting said data elements of said specified vector from said cache to said vector processor.

21. The method as claimed in claim 20, wherein said step of determining the blocks of data which include at least one data element of said vector is performed by a micro-sequencer executing microcode.

22. A method as claimed in claim 21, where in said micro-sequencer determines the blocks of data which include at least one data element of said vector by referencing a vector address register and sequentially computing the addresses associated with successive data elements of the vector and storing the computed address in the vector address register.

23. The method as claimed in claim 22, wherein said micro-sequencer determines the blocks of data which include at least one data element of said vector by referencing a vector length register and changing a value in said vector length register each time said micro-sequencer computes the address associated with one of said successive data elements of said vector.

24. The method as claimed in claim 22, wherein said addresses associated with successive data elements differ by a predetermined stride, and said micro-sequencer successively computes the address associated with every Mth data element of said vector, and selects M as an integer which is a predetermined function of said stride 25. The method as claimed in claim 24, wherein said data blocks have a predetermined size, and said micro-sequencer selects a value for M by comparing said stride to predetermined values, said predetermined values including said predetermined size of the data blocks.

26. A digital computer having a main memory and a cache coupled to said main memory; said main memory including means for storing data elements at respective addresses; said cache including cache memory means for storing selected predefined blocks of said data elements, means for receiving requests to reference a specified block of said data, means for checking whether data for the specified block is stored in the cache memory means, and means operative when data for the specified block is not so stored for reading the specified block of data from said main memory and storing the block of data in the cache memory means; wherein the improvement comprises:
a vector processor coupled to said cache, said vector processor including means for receiving a sequence of data elements from said cache and performing vector operations on said data elements, and prefetch generator means coupled to said vector processor and said cache for prefetching the blocks of data which include the data elements of a vector specified by a vector load instruction, wherein said prefetch generator means includes means for receiving an instruction to obtain a specified vector of said data elements and load them into said vector processor, means for determining the blocks of data which include at least one data element of said vector, and means for transmitting to said cache requests to reference the blocks of data which are determined to include at least one data element of said vector.

27. The digital computer as claimed in claim 26, further comprising means coupled to said cache and said vector processor for transmitting said data elements of said vector from said cache to said vector processor.

28. The digital computer as claimed in claim 27, wherein said means for transmitting said data elements include cache memory bypass means for transmitting to said vector processor said data elements fetched from the main memory when they are being written into the cache.

29. The digital computer as claimed in claim 26, wherein said means for transmitting includes a register coupled in the data path between the main memory and the cache, and a register bypass gate connected to said register for bypassing said register.

30. The digital computer as claimed in claim 26, wherein said means for determining the blocks of data which include at least one data element of said vector includes means for sequentially computing the addresses associated with successive data elements of said vector, and testing whether each computed address is within a different block from the previously computed address.

31. The digital computer as claimed in claim 26, wherein said cache includes a fetch request buffer for buffering said requests to reference the blocks of data, said fetch request buffer providing a signal indicating when the fetch request buffer is full, and said prefetch generator means has means responsive to said buffer full signal for temporarily suspending the transmission of said requests to reference the blocks of data.

* * * * *

UNITED STATES PATENT AND TRADEMARK OFFICE
CERTIFICATE OF CORRECTION

PATENT NO. : 4,888,679

DATED : December 19, 1989

INVENTOR(S) : Tryggve Fossum et al.

It is certified that error appears in the above-identified patent and that said Letters Patent is hereby corrected as shown below:

In Col. 3, line 24, please change "stride" to --"stride"--.

In Col. 5, line 7, please change "powder mill" to --Powdermill--.

In Col. 7, line 23, please change "with" to --ith--.

In Col. 10, line 41, after "changes", please insert --.--.

In Col. 10, line 55, after "register", please insert --.--.

In Col. 13, line 20, after "to", please insert "-".

In Col. 31, line 41, please change "lest" to --least--.

In Col. 31, line 51, please change "A" to --The--.

In Col. 31, line 51, please change "where in" to --wherein--.

In Col. 32, line 2, after "stride", please insert --.--.

Signed and Sealed this

Eleventh Day of December, 1990

*Attest:*

HARRY F. MANBECK, JR.

*Attesting Officer*    *Commissioner of Patents and Trademarks*